(12) United States Patent
Ruffini et al.

(10) Patent No.: US 8,439,780 B2
(45) Date of Patent: May 14, 2013

(54) TENSIONER FOR A DRIVE BELT OF A MOTOR VEHICLE

(75) Inventors: Alberto Ruffini, Chieti Scalo (IT); Andrea Montani, Chieti (IT); Gaetano Ferri, Pescara (IT)

(73) Assignee: Dayco Europe S.r.l., Chieti (IT)

( * ) Notice: Subject to any disclaimer, the term of this patent is extended or adjusted under 35 U.S.C. 154(b) by 670 days.

(21) Appl. No.: 11/988,752

(22) PCT Filed: Jul. 14, 2005

(86) PCT No.: PCT/IT2005/000402
§ 371 (c)(1),
(2), (4) Date: Nov. 20, 2008

(87) PCT Pub. No.: WO2007/007357
PCT Pub. Date: Jan. 18, 2007

(65) Prior Publication Data
US 2009/0239693 A1    Sep. 24, 2009

(51) Int. Cl.
*F16H 7/10* (2006.01)
(52) U.S. Cl.
USPC .......................................... 474/112; 474/134
(58) Field of Classification Search .............. 474/134, 474/133, 135, 137, 109, 112, 113
See application file for complete search history.

(56) References Cited

U.S. PATENT DOCUMENTS

| | | | | |
|---|---|---|---|---|
| 2,277,458 | A * | 3/1942 | Schultze | 474/134 |
| 5,620,385 | A * | 4/1997 | Cascionale et al. | 474/112 |
| 6,857,978 | B2 * | 2/2005 | Polster et al. | 474/134 |
| 7,468,013 | B2 * | 12/2008 | Di Giacomo et al. | 474/134 |
| 7,494,434 | B2 * | 2/2009 | McVicar et al. | 474/109 |
| 2003/0176249 | A1 * | 9/2003 | Polster et al. | 474/134 |
| 2005/0192142 | A1 * | 9/2005 | Stone et al. | 474/101 |
| 2006/0287146 | A1 * | 12/2006 | McVicar et al. | 474/109 |
| 2007/0037648 | A1 * | 2/2007 | Di Giacomo et al. | 474/134 |

FOREIGN PATENT DOCUMENTS

| WO | WO 2004088171 A1 | * | 10/2004 |
|---|---|---|---|
| WO | WO 2005012765 A1 | * | 2/2005 |
| WO | WO 2005038297 A1 | * | 4/2005 |

* cited by examiner

*Primary Examiner* — Michael Mansen
*Assistant Examiner* — Juan Campos, Jr.
(74) *Attorney, Agent, or Firm* — Davidson Berquist Jackson & Gowdey, LLP

(57) ABSTRACT

A tensioner for a belt drive, including a rigid element rotatably connected around a first axis and a couple of idle pulleys supported by a rigid element on opposing parts of axis and adapted to cooperate with respective sections of a belt of belt drive. The tensioner also includes a mobile element hinged to a second fixed axis carrying the first axis.

15 Claims, 5 Drawing Sheets

TENSIONER FOR A DRIVE BELT OF A MOTOR VEHICLE

TECHNICAL FIELD

This invention relates to a tensioner for a drive belt for an internal combustion engine and particularly, but not exclusively, for a drive connecting a crankshaft of the internal combustion engine with a reversible electrical machine, or motor-alternator (starter-alternator), having the dual function of a starter motor and a current generator.

BACKGROUND ART

Patent application WO-A-2005012765 describes a tensioner having a rigid, V-shaped fork including a vertex portion hinged to a fixed axis and a pair of free end portions supporting relative pulleys and cooperating respectively with a stretched section and a slack section of the belt.

When the drive is still, i.e. when the internal combustion engine is turned off, the tensioner remains in a position of static equilibrium determined by a tension which is basically uniform along the entire length of the belt.

During operation, the fork is rotated towards the stretched section via the action of the relative pulley, causing an increase in the average tension of the belt dependent upon the fork rotation and allowing tensioning of the slack section and therefore a correct operation of the drive.

In particular, it was demonstrated experimentally that the known tensioner causes relatively high tensions on the belt during operation and particularly when the internal combustion engine is starting up, thereby tending to overload the belt and the supports.

DISCLOSURE OF INVENTION

The aim of this invention is to provide a tensioner for a belt drive which solves the problems in connection with the known tensioner and specified above.

The aim of this invention is achieved by a tensioner for a drive belt as defined in claim 1.

BRIEF DESCRIPTION OF THE DRAWINGS

For a better understanding of this invention, a preferred embodiment is described, by way of non-limitative example and with reference to the attached drawings, in which.

BEST MODE FOR CARRYING OUT THE INVENTION

Figure 1:
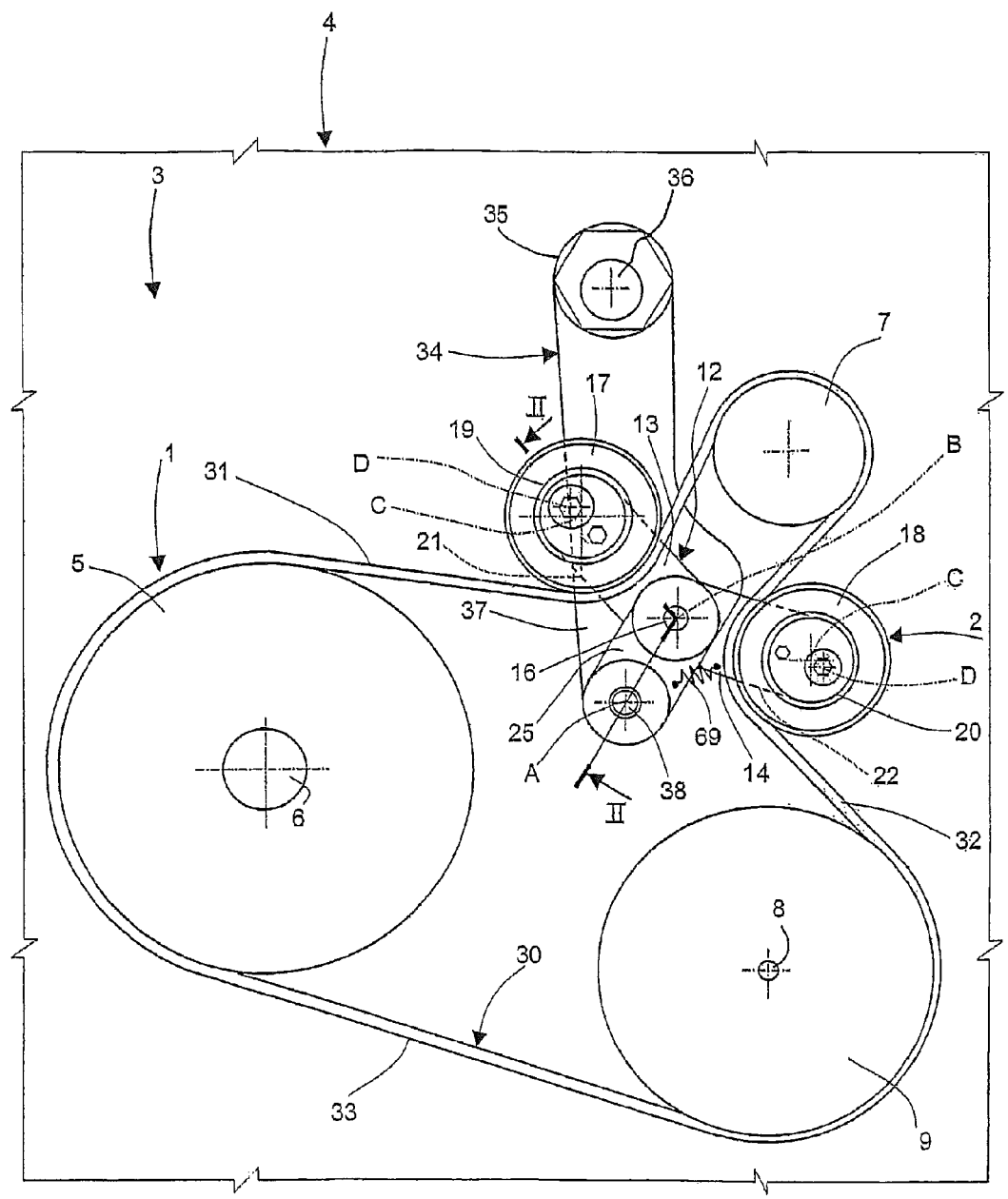
FIG. 1 is a front view of a belt drive, including a tensioner according to this invention.

In FIG. 1, numeral 1 indicates a whole a belt drive 1 for an internal combustion engine 4 of a motor vehicle, including a first pulley 5 connected to a crankshaft 6 of engine 4 and arranged on an external wall 3 of engine 4, a second pulley 7 supported by an output shaft 8 of a motor-alternator, not illustrated, and a third pulley 9 for driving an accessory, also not illustrated, such as the compressor of a conditioning system, a belt 30 wrapped around the aforementioned pulleys and a tensioner 2 hinged to a fixed axis A on external wall 3.

Tensioner 2 includes a rigid element 12 having two straight arms 13, 14 arranged at 150° and diverging from a flat connection portion 15, and a pin 16 extending from connection portion 15 and having an axis B perpendicular to connection portion 15.

Also, the tensioner 2 includes a pair of idle pulleys 17, 18 supported at free ends 21 and 22 of arms 13, 14 via respective eccentrics 19, 20, radially contained inside the dimensions of the respective pulley 17, 18.

Figure 2:
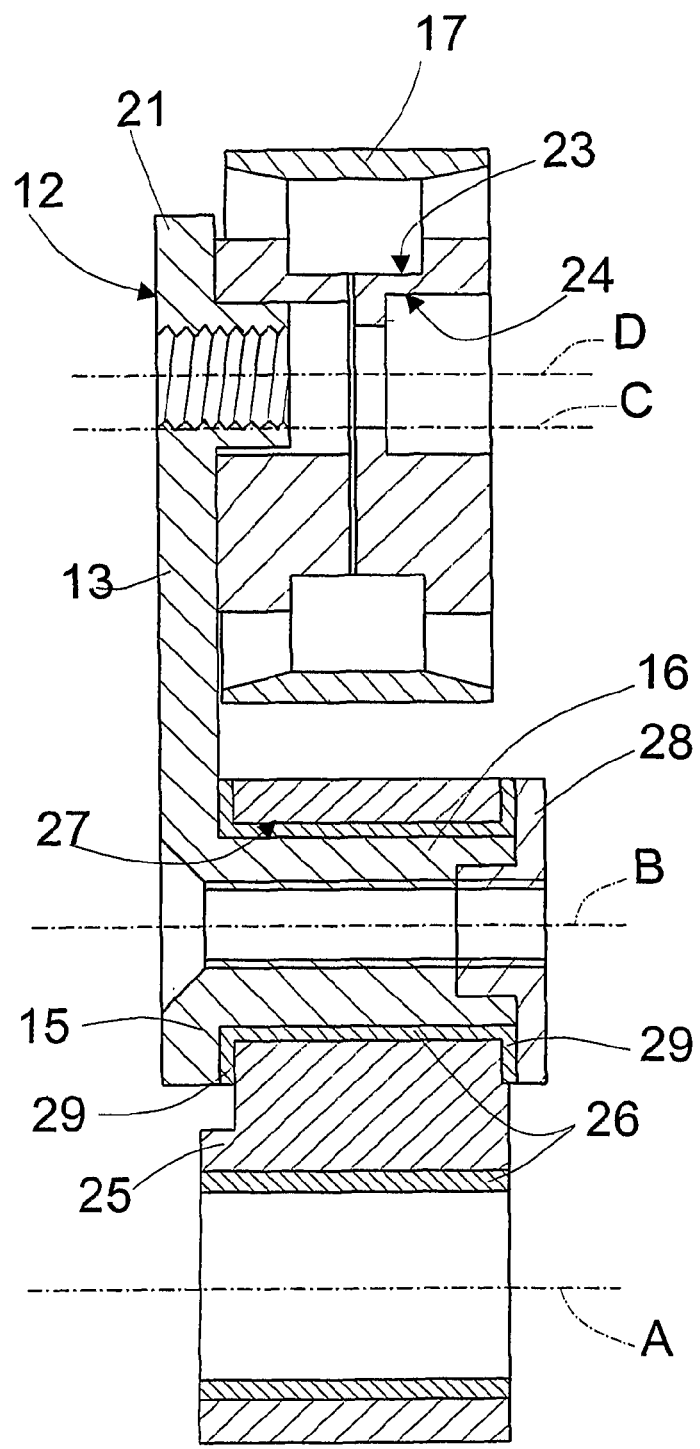
FIG. 2 is a cross-section of the tensioner in FIG. 1, taken along line II-II.

In particular (FIG. 2), each eccentric 19, 20 has an external surface 23 for guiding rotation of respective idle pulley 17, 18 about an axis C parallel to axis A, and a through hole 24 having an axis D parallel to axis B and spaced with respect to axis C, and housing a screw (not shown) for connection to the respective arm 13, 14.

Tensioner 2 also includes a mobile element 25 hinged at its ends to fixed axis A and to pin 16 of connection portion 15 respectively, and also provided are respective bushes 26 made of a low friction material, such as a polytetrafluoroethylene-based one, positioned coaxially to respective axes A and B between the surfaces in relative motion.

In particular, pin 16 is housed freely rotatable in hole 27 of mobile element 25 and mobile element 25 is blocked axially to rigid element 12 between connection portion 15 and a closing element 28 screwed onto pin 16 from the opposite side with respect to connection portion 15. Tensioner 2 is also equipped with a pair of washers 29 positioned concentrically to axis B to support mobile element 25 axially against connection portion 15 and closing element 28.

Belt 30, for example of the Poly-V type, is wrapped around pulleys 5, 7 and 9 and passes between idle pulleys 17, 18, forming a closed path having a first section 31 between first pulley 5 and second pulley 7, a second section 32 between second pulley 7 and third pulley 9, and a third section 33 between third pulley 9 and first pulley 5.

Also, tensioner 2 is assembled on engine 4 via a supporting arm 34 including an end portion 35 fixed to a remote portion of external wall 3 via an eccentric adjusting device 36, and a second end portion 37 opposite the first and connected to mobile element 25 via a screw 38 defining axis A.

In particular, adjusting device 36 is housed in a circular space defined by end portion 37 and allows, during assembly, to adjust both the inclination and the position of supporting arm 34, in order to define the initial tension of belt 30 and an optimum position of axis A, a position which nonetheless remains fixed during use when adjusting device 36 is blocked.

The operation of tensioner 2 is as follows.

In use, the angular position of tensioner 2 is determined by the condition of equilibrium on rotation around axis A of the resultants of the tension forces exercised by sections 31, 32 on pulleys 17, 18 and, therefore, on respective arms 13, 14 of rigid element 12 and on mobile element 25.

In conditions of zero transmitted torque, and in particular with the engine turned off, the tension on belt 30 is uniform on all sections and tensioner 2 is in the rest position shown in FIG. 1. Also, this static value of tension may be adjusted via appropriate regulation of eccentrics 19, 20, which maintain their position during functioning once the respective screws have been tightened.

Given the rotation direction of driving shaft 6, clockwise with reference to FIG. 1, in the presence of a torque transmitted by engine 4 to motor-alternator and (or) to the accessory, the tension of belt 30 in section 32 (stretched section) becomes greater than the tension in section 31 (the "slack" section). This difference between the tension in section 31 and the one in section 32 causes rotation of tensioner 2 towards the stretched section, until a new position of (dynamic) equilibrium is reached, where the resultants of the forces of tension balance again.

According to this invention, tensioner 2 is assembled in a manner that any deviation from the rest position tends to cause the belt to lengthen. It is therefore clear that the new position imposed on tensioner 2 by the difference in tension between the two sections 31, 32 tends to lengthen belt 30 and to produce a consequent increase in tension (average) due to elastic reaction, compared with the static tension previously defined.

What is described above corresponds with normal operation of the drive when the vehicle is running.

Tensioner 2 operates in an identical manner even when the motor-alternator works as an electrical motor and drives internal combustion engine 4. In this case, the direction of the torque is inverted, i.e. section 31 becomes the stretched section and section 32 becomes the slack section, and tensioner 2 rotates in the opposite direction (towards stretched section 31), producing an increase in the average tension of the belt in this case as well.

Figure 3B:
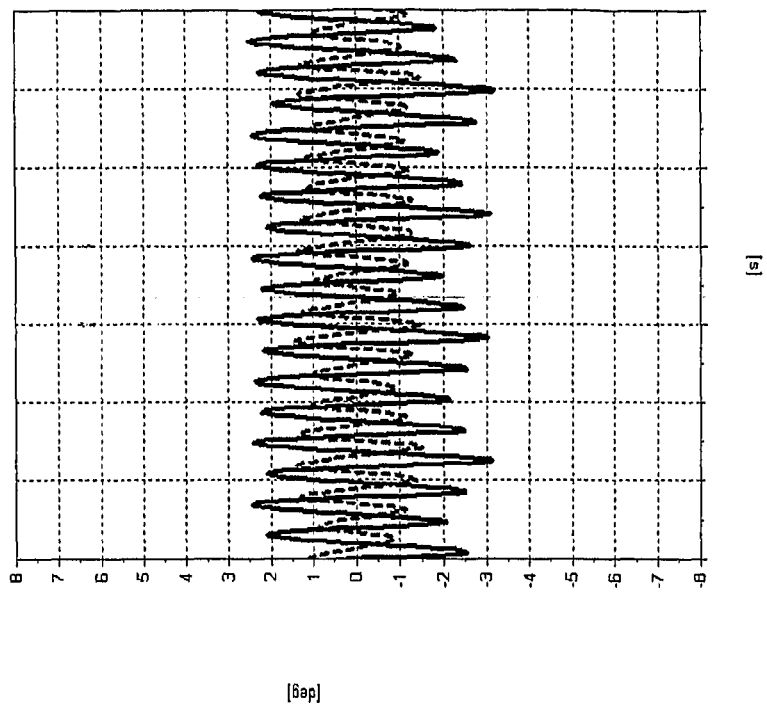
FIGS. 3a and 3b are two graphs in which the angular oscillations of two components of the drive are compared, respectively where an automatic single-arm tensioner of the traditional type is used and where a tensioner according to this invention is used.
Figure 3A:
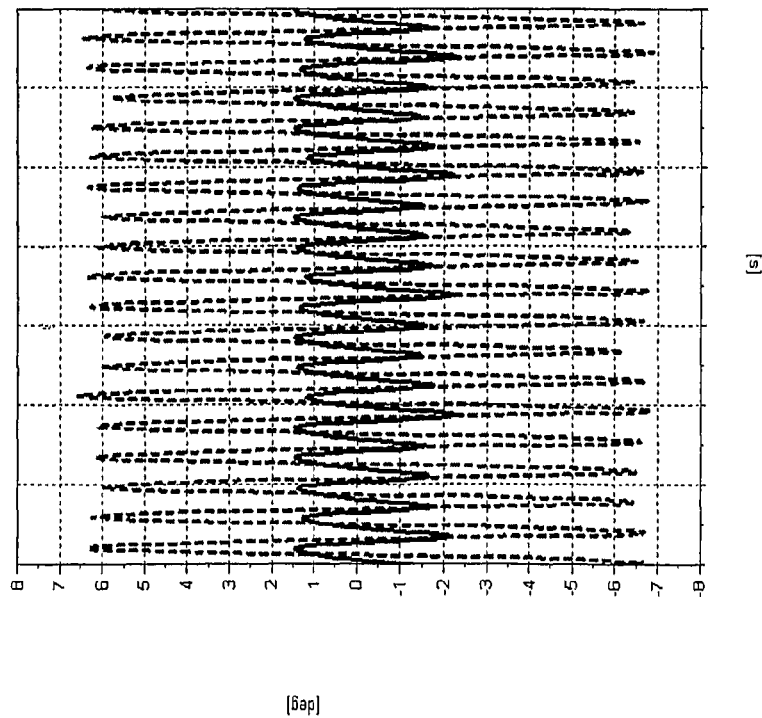

In FIG. 3a, the progress of the torsional oscillations respectively of first pulley 5 of driving shaft 6 (continuous line) and second pulley 7 of the motor-alternator (broken line) are overlapped as a function of the time, in the case of a drive similar to the one in FIG. 1, where tensioner 2 of the invention is replaced with a singe-arm spring tensioner cooperating with section 31.

Also, pulley 7 of the belt relating to FIG. 3a includes a device free wheel device and no a torsional vibration damper for crankshaft 6 is used.

As may be noted, the torsional oscillations on second pulley 7 are amplified compared to those of first pulley 5, due to the difference in diameters, respectively one lower than the other three times.

FIG. 3b shows the progress as a function of the time of the torsional oscillations respectively of first pulley 5 of crankshaft 6 (continuous line) and second pulley 7 of the motor-alternator (broken line), during an identical test to the previous one and with a configuration that differs only in that the drive includes the tensioner 2 of the invention and second pulley 7 is rigidly connected to an output shaft of the motor-alternator.

As may be noted, in this case, oscillation of second pulley 7 is in quadrature with regard to that of pulley 5 and the amplitude of oscillation of second pulley 7 is basically half that of first pulley 5, obtaining efficient damping of the fluctuations in tension on belt 30, even without using a dedicated damper.

Figure 4A:
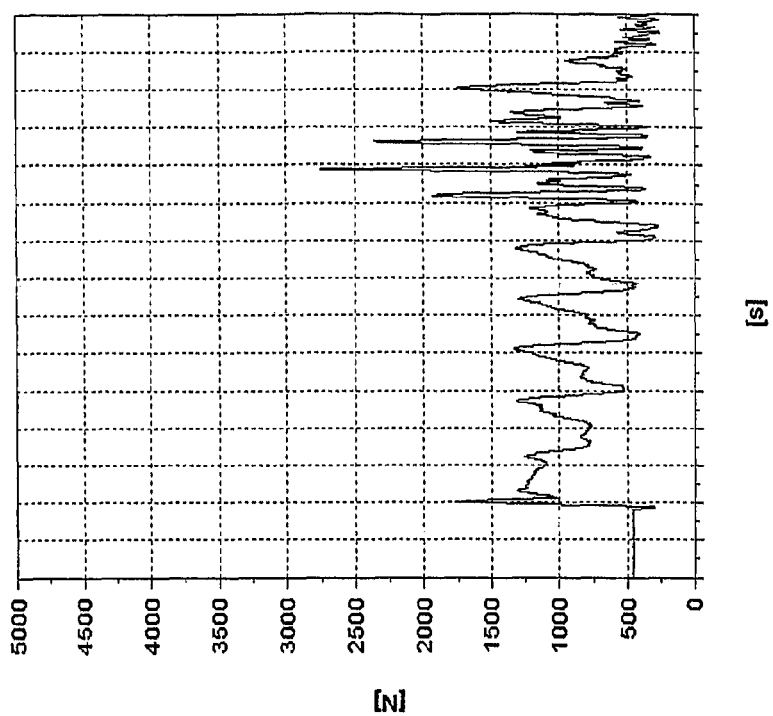
FIGS. 4a, 4b are graphs showing the curve of the load on a pulley bearing of the drive, respectively where a tensioner with rigid arms of known type and where a tensioner according to this invention is used.
Figure 4B:
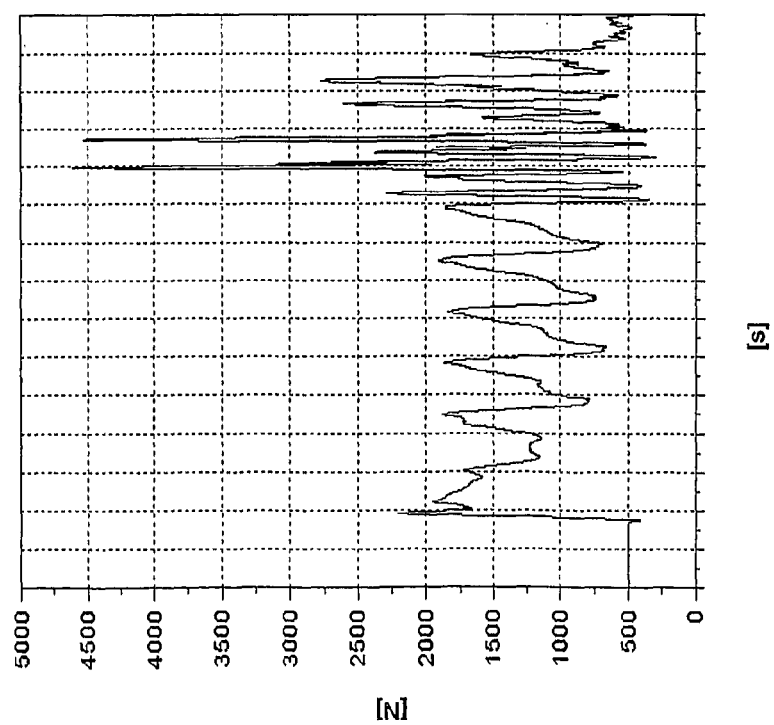

FIGS. 4a and 4b show the loads on the bearing of third pulley 9, indicative of the belt tension, during a start-up phase of engine 4, via the motor-alternator. In particular, FIG. 4a shows the load where tensioner 2 is used, and FIG. 4b shows the load where the known tensioner shown in FIG. 1 of patent WO-A-2005012766 is used.

As may be noted, starting with the same value of static tension, the value of the load obtainable using tensioner 2 is lower compared with the one obtainable using the known tensioner.

An analysis of the features of tensioner 2 according to this invention clearly shows the advantages it allows to obtain.

Thanks to the use of mobile element 25 hinged to rigid element 12, it is possible to obtain lower values of the operating tension, leading to less stress on the components.

Also, the structure of the tensioner is compact, simple, inexpensive and fixed to external wall 3 on the fixed axis A, without any particular assembly problems.

Also, thanks to the labile structure, tensioner 2 efficiently dampens the amplitude of the vibrations stressing the pulley of the motor-alternator (as shown in FIG. 4), thereby allowing more compact sizing, or even elimination, of the damper devices which are generally used on traditional drives.

The use of supporting arm 34 allows adaptability to different configurations of external side 3 and regulation device 36 allows simple adjustment of both the initial tension of belt 30 and of the position of axis A.

It is clear that modifications and variants may be made to the tensioner described without departing from the scope of protection of this invention, as defined in the attached claims.

Figure 5:
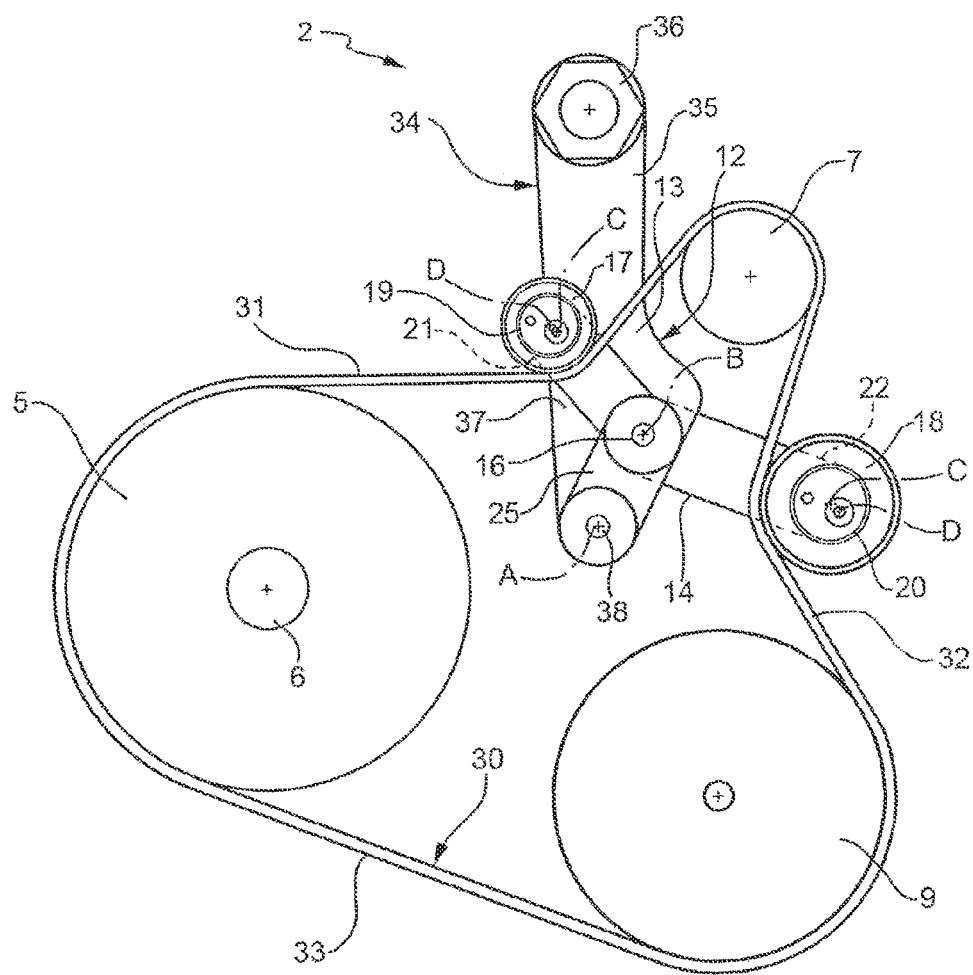
FIG. 5 is a front view of a belt drive showing an alternative embodiment.

In particular, the structure of the tensioner depends on the geometry of the closed path of belt 30 and therefore the position of fixed axis A may vary and arms 13, 14 may be tilted to a greater or lesser extent and may have equal or different lengths, as may the diameters of idle pulleys 17, 18, as shown in FIG. 5.

According to this invention, the tensioner operates with minimum tension of belt 30 when idle. However, this tension may be reduced to zero following permanent lengthening of belt 30 during its lifetime, and cause slippage under load; in order to avoid this problem, a return spring 69 may be included, acting between rigid element 12 and mobile element 25. This spring, only shown schematically in FIG. 1, has the mere function of ensuring minimum tension at rest even when the aforementioned permanent lengthening is present; it should be noted that the elastic action required from this spring is, in any case, much lower than that of the springs on traditional tensioners, which must ensure the tension on the slack section not only at rest, but also during operation, and its sizing is therefore much less critical.

It is also possible for tensioner 2 not to be equipped with eccentrics 19, 20 and for axes C of pulleys 17, 18 to be fixed onto rigid element 12. In this case, the initial tension of belt 30 is adjusted via adjusting device 36, by adjusting the position of fixed axis A during assembly.

The invention claimed is:

1. A tensioner for a belt drive, including a rigid element rotatably connected about a first axis (B), a pair of idle pulleys supported by said rigid element on opposing sides of said first axis (B) and adapted to cooperate with respective sections of a belt of said belt drive and a first adjusting mechanism to adjust the position of a second axis (A) and lock that second axis (A) in a fixed position to define the initial tension of said belt, wherein said first adjusting mechanism includes an eccentric mount, and further includes a mobile element having one end hinged about the second, fixed axis (A) and an opposite end carrying said first axis (B).

2. The tensioner according to claim 1, further including a supporting arm connected to said first adjusting mechanism and carrying said second axis (A).

3. The tensioner according to claim 1, further including a second adjusting mechanism to adjust the position of at least one of two idle pulleys with respect to said rigid element.

4. The tensioner according to claim 3, wherein the said second adjusting mechanism is radially contained inside said at least one of two idle pulleys.

5. The tensioner according to claim 4, wherein the said second adjusting mechanism includes an eccentric mount to the rigid element.

6. The tensioner according to claim 3 wherein a second adjusting mechanism is provided for each idle pulley.

7. The tensioner according to claim 6 wherein the second adjusting mechanism comprises an eccentric mounting structure.

8. The tensioner according to claim 1, wherein the said rigid element includes a pin defining said first axis (B), said pin being radially coupled with a hole provided within said mobile element via a bushing comprised of a low friction material.

9. The tensioner according to claim 1, wherein the said rigid element includes a first and a second arm converging with each other and connected rigidly to a connection portion hinged around said first axis (B).

10. The tensioner according to claim 9, wherein the first and second arms have the same length.

11. The tensioner according to claim 9, wherein the first and second arms have different lengths.

12. The tensioner according to claim 1, wherein respective diameters of each of said pair of idle pulleys are equal.

13. The tensioner according to claim 1, wherein respective diameters of each of said pair of idle pulleys are different.

14. The tensioner according to claim 1, further including a return spring positioned between said mobile element and said rigid element to provide additional tension to said belt.

15. A tensioner for a belt drive comprising:
 a rigid element rotatably connected about a first axis (B),
 a pair of idle pulleys supported by and eccentrically mounted to said rigid element on opposing sides of said first axis (B) and adapted to cooperate with respective sections of a belt of said belt drive,
 a first adjusting mechanism to adjust and control the position of a second axis (A) and lock that second axis (A) in an adjusted position to define an initial tension of said belt, said first adjusting mechanism including an eccentric mounting mechanism, and
 a mobile element having one end hinged about the second axis (A) and an opposite end carrying said first axis (B).

* * * * *